No. 672,347. Patented Apr. 16, 1901.
E. BESSE & L. LUBIN.
MEANS FOR APPLYING SOLDER TO METALLIC ARTICLES.
(Application filed Mar. 30, 1900.)
(No Model.)

Witnesses:
John Lotka
Paul Hunter

Inventors:
Emile Besse
Louis Lubin
By Munn
Attorneys.

United States Patent Office.

EMILE BESSE AND LOUIS LUBIN, OF PARIS, FRANCE.

MEANS FOR APPLYING SOLDER TO METALLIC ARTICLES.

SPECIFICATION forming part of Letters Patent No. 672,347, dated April 16, 1901.

Application filed March 30, 1900. Serial No. 10,802. (No model.)

*To all whom it may concern:*

Be it known that we, EMILE BESSE and LOUIS LUBIN, citizens of the Republic of France, residing at 93 Rue d'Angoulême, Paris, France, have invented certain new and useful Improvements in Means for Applying Solder to Metallic Articles, of which the following is a specification.

This invention relates to an apparatus whereby the lids or bottoms of metal cans or boxes for preserved food and of other metal receptacles that are closed by soldering may have rings, frames, or bands of soldering metal fixed rapidly and economically upon their peripheries preparatory to the soldering operation, such rings, &c., being afterward melted by means of a soldering-iron for soldering the lid effectually to the can or box. For this purpose the lid or bottom, previously suitably shaped either with a groove around its periphery or with a flange, has a number of small holes punched in its periphery, and upon its inner face is laid a circular or oval ring or a rectangular or other-shaped frame of soldering metal, (according to the shape of the can or box.) Such ring, &c., are formed of a thread or band of soldering metal, which is coiled up in the form of a helical coil upon a mandrel having the same cross-section as the can or box, the coil being then cut into lengths for the said solder-rings. Thereupon the ring of solder thus prepared is placed in the groove or recess provided for it in the lid or bottom and is there crushed or compressed by means of a die or punch, preferably heated, whereby the ring is made to fit tightly against the sides of the groove in the lid or bottom and is also forced into the before-mentioned punched holes, the ring, &c., of solder being thus securely attached to the lid or bottom. The ring of solder is preferably so crushed or compressed as to form a groove therein, into which then fits the edge of the body of the can or box, so that this is thereby accurately placed in position for the soldering operation relatively to the lid or bottom.

The above-described mechanical operations can be practically carried out by means of apparatus such as is shown, by way of example, on the accompanying drawings, in which—

Figure 1:
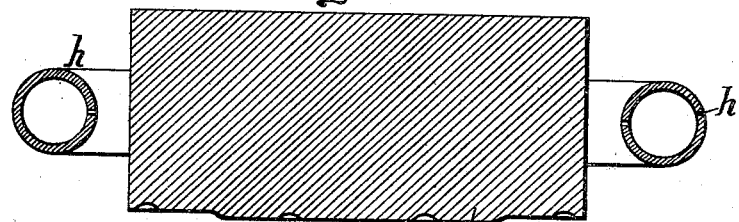
Figure 1:
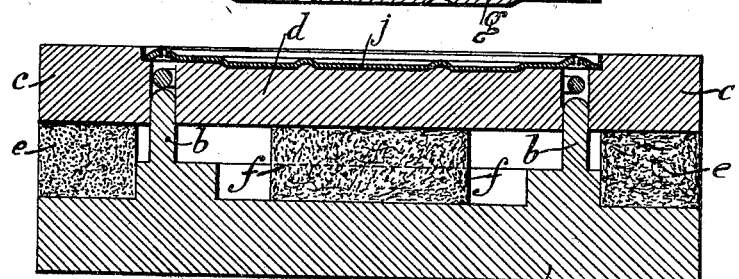
Figure 2:
Figure 3:
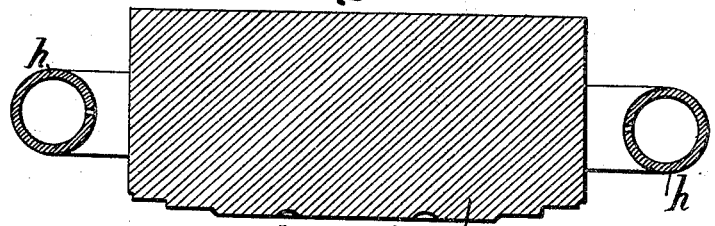
Figure 3:
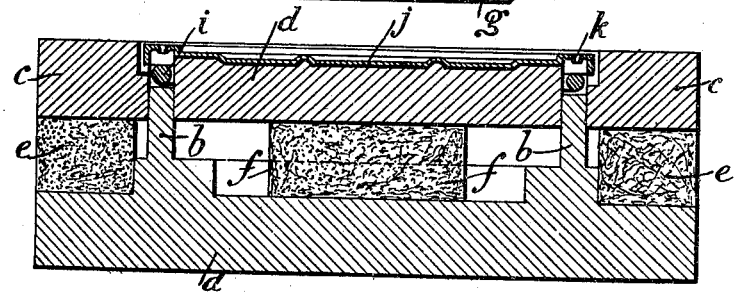
Figure 4:
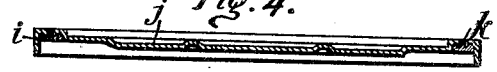

Figures 1 and 3 show vertical sections on the axial line of an apparatus, serving to fix the rings, bands, or frames of soldering metal on the bottoms or lids, having either grooved or flanged peripheries. Fig. 2 shows a cross-section of a lid or bottom with grooved periphery; and Fig. 4 shows a cross-section of a lid or bottom with flanged periphery, the ring or frame of solder having been fixed in position thereon in either case by the apparatus shown in Figs. 1 and 3. The lid or bottom is then ready for soldering.

The apparatus is composed of a matrix or base $a$, from which projects a continuous partition $b$, of the same configuration in plan as the transverse sectional form of the can or box to be soldered, and consequently also as the configuration of its lid and bottom. Against the inner and outer surfaces of this partition fit, respectively, sliding plates $c$ and $d$, supported by cushions $e$ and $f$, of caoutchouc or other suitable elastic material.

Directly above the plate $d$ is a die $g$, receiving an up-and-down motion, the under face of which die has a recessed configuration corresponding to the relief configuration of the lid or bottom to be operated upon, while the upper surface of the plate $d$ has the same configuration in relief, so that the lid or bottom J fits accurately thereon. The die $g$, which is supported and actuated in any suitable manner, is surrounded by a gas-burner $h$, so as to maintain it, if necessary, at a temperature near the fusing-point of the solder.

The apparatus operates as follows: On the top of the partition $b$, in the space between the plates $c$ and $d$, is placed the ring, frame, or band of soldering metal $i$, after which the cover or bottom $j$, previously formed with either a groove or a flange and with perforations $k$ $k$, formed with a conical punch, so as to produce inwardly-tapering or dovetail holes, as shown, is then placed upon the plate $d$. The die $g$ is then lowered with sufficient force to, first, depress the two plates $c$ and $d$, compressing the caoutchouc cushions, and also to press the cover or bottom J down with the plate $d$, and, secondly, to crush the ring of solder $i$ between the top of the partition $b$ and the groove of the lid, causing the solder to be forced through the dovetail perforations $k$ of the lid, the solder being thus securely held on the latter by these dovetail tenons, so that the lid or bottom can afterward be subjected to any manipulations for the soldering without risk of the solder becoming detached.

The above operation is facilitated by the heating of the die $g$, whereby the solder is rendered so soft as to readily squeeze into the dovetail holes.

If the lid is grooved at its periphery, as shown in Figs. 1 and 2, the upper edge of the partition $b$ is rounded, so that in compressing the solder it forms a groove therein, into which groove the edge of the can or box fits, thus insuring the correct central position of the can relatively to the lid for the soldering operation. When the lid is formed with a flange or rim, as at Figs. 3 and 4, this precaution is not required, as the flange insures the correct relative positions. This flange, which is required to fit as accurately as possible against the outer surface of the can or box, presents the further advantage of retaining between it and the said surface some of the liquefied metal resulting from the melting of the ring of solder, so that the air-tight closure of the joint is doubly insured by the interposition of the solder both between the outer cylindrical surface of the can and the flange of the lid and between the latter and the upper edge of the can. In either case the die $g$ can be actuated either by hand, by means of a lever or other press of any description, or it may be actuated by power.

It will be evident that our above-described apparatus for fixing rings or frames of soldering metal upon the lids and bottoms of cans or boxes can also be employed for fixing bands of soldering metal upon the sides of the cans or boxes themselves, these being formed with the necessary grooves for the reception thereof.

Having now particularly described and ascertained the nature of our said invention and in what manner the same is to be performed, we declare that what we claim is—

1. An apparatus for affixing solder to metallic surfaces, which consists first of a matrix from which projects a continuous partition of the same configuration in plan as the surface to be soldered, and provided on each side with a sliding plate carried by elastic supports, and secondly of a vertically-movable die, capable of being heated, the under surface of which has the relief configuration of the surface to be soldered formed in intaglio thereon, while the upper surface of the central plate of the matrix has the said configuration formed in relief thereon, substantially as and for the purposes described.

2. An apparatus for affixing solder to metallic articles, comprising a die having an inner section adapted to support the central portion of the article, an outer section spaced therefrom, a solder-support located between said sections and having sliding engagement therewith, and another die arranged to press the marginal portion of the article toward the solder-support.

3. An apparatus for affixing solder to metallic articles, comprising a base with a solder-support projecting upwardly therefrom, a die having two sections arranged on the inside and outside respectively of the solder-support and having sliding engagement therewith, a yielding support interposed between said die and the base, and another die having a compressing portion in registry with the solder-support.

In witness whereof we have hereunto set our hands in presence of two witnesses.

EMILE BESSE.
LOUIS LUBIN.

Witnesses:
ARMAND FRANZ,
WALDEMAR B. KAEMPFFERT.